I. E. BRADSHAW.
SANITARY MILKING VESSEL.
APPLICATION FILED JULY 26, 1913.
1,104,773.
Patented July 28, 1914.
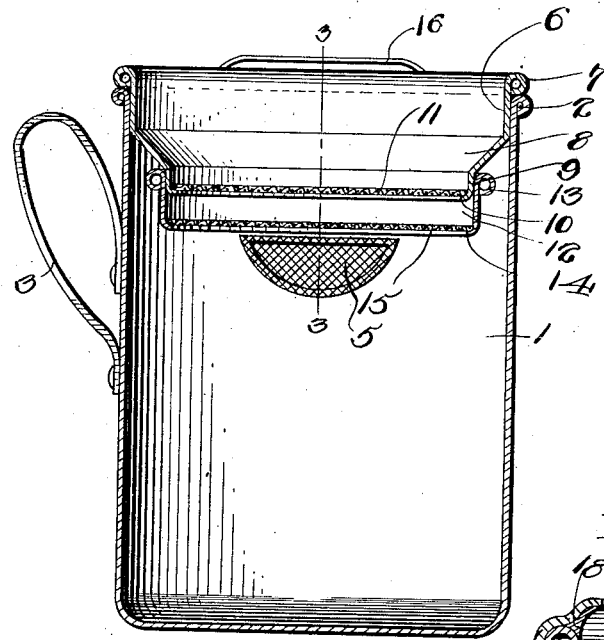
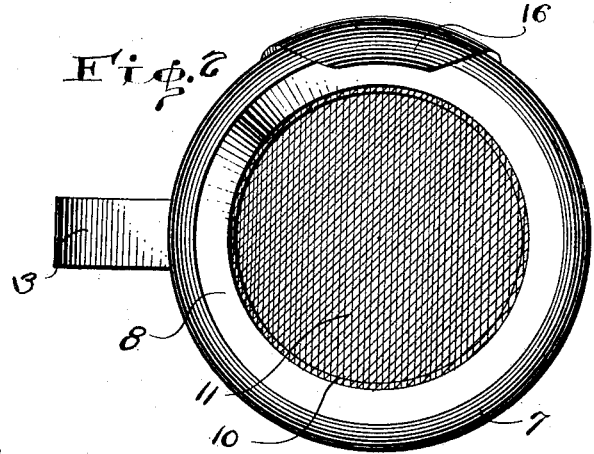
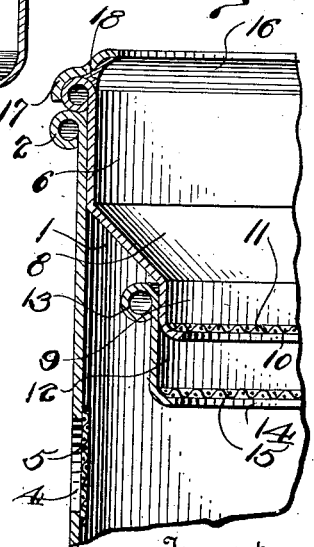
Witnesses
Howard F. Costello
H. E. Vrooman
Inventor
Ira E. Bradshaw
By E. E. Vrooman,
his Attorney.

UNITED STATES PATENT OFFICE.

IRA EARNEST BRADSHAW, OF UNIONVILLE, MISSOURI.

SANITARY MILKING VESSEL.

1,104,773.  Specification of Letters Patent.  Patented July 28, 1914.

Application filed July 26, 1913. Serial No. 781,377.

*To all whom it may concern:*

Be it known that I, IRA E. BRADSHAW, a citizen of the United States of America, residing at Unionville, in the county of Putnam and State of Missouri, have invented certain new and useful Improvements in Sanitary Milking Vessels, of which the following is a specification, reference being had therein to the accompanying drawing.

This invention relates to a sanitary milking vessel and has for its object the production of a simple and efficient device for allowing the milk to be strained as it is placed within the same.

Another object of the invention is the production of a plurality of strainers which are adapted to fit within the vessel for straining the milk, these strainers being adapted to be removed and disassembled for facilitating the cleansing of the same.

With these and other objects in view this invention consists of certain novel combinations, constructions and arrangements of parts as will be hereinafter fully described and claimed.

In the accompanying drawing: Figure 1 is a central vertical section taken through the vessel showing the strainers positioned thereon. Fig. 2 is a top plan view of the device. Fig. 3 is an enlarged section taken on the line 3—3 of Fig. 1.

Referring to the accompanying drawing by numerals 1 designates an ordinary vessel having a rolled portion 2 at its upper edge. This vessel is also provided with a lifting handle 3 and an opening 4. A filtering wire 5 is positioned within the vessel 1 so as to overhang the opening 4 whereby the milk will be filtered as the same is passed therethrough, while this wire will also prevent any foreign object or dirt from entering into the interior of the vessel 1 through the opening 4. It will also be noted that the opening 4 is positioned at right-angles to the handle 3 whereby the person using the device may tip the same by means of the handle 3 and may observe the milk as the same passes through the opening 4 without necessitating any undue motion which would be caused by positioning the opening upon the opposite side of the vessel relative to the handle, if the user desires to observe the milk as the same is emptied from the vessel.

The device is provided with a pair of strainers for filtering the milk as the same is placed within the vessel 1. The primary strainer comprises a vertical body 6 having at its upper edge a rolled portion 7. The vertical body 6 is adapted to be positioned within the vessel 1 so as to fit snugly within the inner side thereof for preventing the entrance of dirt into the vessel between the vertical body 6 and the side of the vessel 1. The rolled portion 7 of the primary strainer will rest upon the rolled portion 2 of the vessel 1 and will in this manner limit the inward movement of the primary strainer relative to the vessel 1. The vertical body 6 is provided at its lower portion with an inclined side 8, this side 8 being provided with a depending collar 9 terminating in a bent flange 10. A mesh filter 11 is held in engagement with this flange 10 in any suitable manner such as solder or by crimping the same in engagement. In this manner the mesh filter 11 will be held fixedly in engagement with the primary strainer and may be easily removed from the vessel when desired.

The auxiliary strainer comprises a circular straight body 12 having a rolled portion 13 at its upper edge and an inwardly bent flange 14 at its lower edge. The straight body 12 of the auxiliary strainer will fit snugly upon the depending collar 9 of the primary strainer while the rolled portion 13 of the auxiliary strainer will allow the auxiliary strainer to be easily positioned upon the primary strainer. A mesh filter 15 is positioned upon the circular flange 14 and is held in position in any suitable manner similar to the manner in which the mesh filter 11 is held in position. It will be seen that since the depending collar 9 is positioned at a spaced distance from the inner face of the receptacle 1, the rolled portion 13 of the auxiliary strainer will not in any way interfere with placing the auxiliary strainer and the lower portion of the primary strainer within the receptacle 1.

A curved lip 16 having a bent portion 17 is fitted upon the rolled portion 7 of the body 6 and is held in position by means of the solder 18 or other suitable means. This lip 16 extends for only a short distance around the upper portion of the primary strainer, but is so positioned as to be placed above the opening 4. By forming this lip upon the primary strainer, the foam or other refuse which may be within the primary strainer will be prevented from running out as the milk within the vessel 1 is emptied through the opening 4.

When this device is used it will be seen that the auxiliary strainer is slipped upon the depending collar 9 at which time the strainers may be positioned within the upper portion of the vessel 1. As the milk is poured into the primary strainer it will pass down through the wire filter 11 and then through the wire filter 15 into the vessel 1. When it is desired to empty the vessel 1 by tilting the same the milk will pass out through the opening 4 while the lip 16 will prevent any refuse contained within the primary strainer from passing therefrom.

It will, of course, be obvious that any sized vessel may be used instead of the device herein illustrated.

It will be seen that a vessel of an enlarged size, such as a bucket being provided with a bail may be used without departing from the spirit of this invention, since the strainers will retain their exact construction set forth.

From the foregoing description it will be seen that a simple and efficient strainer has been produced which will efficiently cleanse the milk of any refuse which may be carried thereby and which may be easily disassembled for cleansing the same.

Having thus described the invention, what is claimed as new, is:—

In a device of the class described the combination of a hollow body, of a primary strainer carried by the upper portion of said body, said primary strainer comprising a vertical side fitting snugly within said body, an inclined side formed upon the lower portion of said vertical side, a depending collar integrally formed upon the lower portion of said inclined side and terminating in an inwardly bent flange, a wire filtering mesh fixedly secured to said flange for forming a filter for said primary strainer, an auxiliary strainer carried by said primary strainer, said auxiliary strainer comprising a circular body having an integral flange at its lower end, a wire filter fixedly secured to said last mentioned flange, said circular body of said auxiliary section adapted to fit upon said depending collar of said primary section, whereby said wire filters will be placed in alinement and said strainer capable of being separated for cleaning the same.

In testimony whereof I hereunto affix my signature in presence of two witnesses.

IRA EARNEST BRADSHAW.

Witnesses:
W. A. SHELTON,
NEAL B. MARSHALL.

---

Copies of this patent may be obtained for five cents each, by addressing the "Commissioner of Patents, Washington, D. C."